United States Patent
Molina Romero et al.

(10) Patent No.: US 12,458,333 B2
(45) Date of Patent: Nov. 4, 2025

(54) DEVICE FOR CONVERTING A SURGICAL INSTRUMENT INTO A SPREADER

(71) Applicants: SERVEI DE SALUT DE LES ILLES BALEARS—IBSALUT, Palma (ES); FUNDACIÓ INSTITUT D'INVESTIGACIÓ SANITÀRIA ILLES BALEARS—IDISBA, Palma (ES)

(72) Inventors: Francesc Xavier Molina Romero, Palma (ES); José Miguel Moron Canis, Palma (ES); Leandro Augusto Brogi, Palma (ES); Emilio Romo Perez, Palma (ES)

(73) Assignees: SERVEI DE SALUT DE LES ILLES BALEARS—IBSALUT, Palma (ES); FUNDACIÓ INSTITUT D'INVESTIGACIÓ SANITÀRIA ILLES BALEARS—IDISBA, Palma (ES)

( * ) Notice: Subject to any disclaimer, the term of this patent is extended or adjusted under 35 U.S.C. 154(b) by 164 days.

(21) Appl. No.: 18/251,686

(22) PCT Filed: Feb. 7, 2022

(86) PCT No.: PCT/EP2022/052851
§ 371 (c)(1),
(2) Date: May 3, 2023

(87) PCT Pub. No.: WO2022/167644
PCT Pub. Date: Aug. 11, 2022

(65) Prior Publication Data
US 2023/0414213 A1 Dec. 28, 2023

(30) Foreign Application Priority Data
Feb. 8, 2021 (ES) ................. P202130093

(51) Int. Cl.
*A61B 17/29* (2006.01)
*A61B 17/02* (2006.01)

(52) U.S. Cl.
CPC .......... *A61B 17/0218* (2013.01); *A61B 17/29* (2013.01)

(58) Field of Classification Search
CPC ........................... A61B 17/29; A61B 17/0218
See application file for complete search history.

(56) References Cited

U.S. PATENT DOCUMENTS

2007/0213734 A1* 9/2007 Bleich ................ A61B 17/1671
606/79
2009/0099422 A1 4/2009 George
(Continued)

FOREIGN PATENT DOCUMENTS

CN 202982087 U 6/2013
CN 103181793 B 5/2015
(Continued)

*Primary Examiner* — Si Ming Ku
(74) *Attorney, Agent, or Firm* — Seed Intellectual Property Law Group LLP

(57) ABSTRACT

A device for providing the spreading function to a surgical instrument of 5 mm diameter comprising a linear body of circular section, such that the device comprises a body comprising a first side, and a second side comprising: at least two grooves configured to perform a folding of the body; a housing configured to be traversed by the circular section linear body of the surgical instrument of 5 mm diameter, and two tabs having a section with a circular sector shape and spaced a distance apart such that the circular section linear body of the surgical instrument can be accommodated between the tabs, such that the body is configured to be in a U-shaped folded position and in a flat unfolded position.

7 Claims, 3 Drawing Sheets

(56) References Cited

U.S. PATENT DOCUMENTS

| | | |
|---|---|---|
| 2011/0137128 A1 | 6/2011 | Poo et al. |
| 2011/0230869 A1 | 9/2011 | Altamirano |
| 2014/0316209 A1 | 10/2014 | Overes et al. |
| 2018/0280013 A1 | 10/2018 | Ravikumar et al. |
| 2020/0253592 A1 | 8/2020 | Popejoy et al. |

FOREIGN PATENT DOCUMENTS

| | | |
|---|---|---|
| CN | 109199538 A | 1/2019 |
| CN | 210784462 U | 6/2020 |
| EP | 2359757 A1 | 8/2011 |
| WO | 2013009795 A1 | 1/2013 |

\* cited by examiner

DEVICE FOR CONVERTING A SURGICAL INSTRUMENT INTO A SPREADER

FIELD OF THE INVENTION

This invention relates to a device for providing the function of a spreader to a surgical instrument of 5 mm diameter which permits the simultaneous use of the surgical instrument with the function of a spreader. The device is of application in the medical industry dedicated to the instrumentation of laparoscopic surgery of any health specialty.

BACKGROUND ART

In laparoscopic surgery, various elements are used, such as trocars that are placed in the abdomen and function as a portal for the subsequent placement of other instruments, such as forceps, scissors and fasteners and an additional element are the spreaders which are introduced through a trocar and are placed holding an organ in a way that does not block the view or the work to be performed in the surgery.

Traditional spreaders are elements that are introduced through a trocar and remain fixed in the location of use, preventing the use of the trocar for another possible surgical tool.

In the state of the art there are spreaders that are developed from a telescopic central element that folds and deploys two lateral wings that together with the central element configures an element of support or separation of the organ; there are also rigid spreaders that provide the support element or separation of the organ by means of rigid parts, i.e., the lateral wings and the central element are rigid.

Thus, considering the limitation of the spreaders known in the state of the art, the need arises to develop a new spreader which improves the performance of the aforementioned spreaders in order to, for example, to use spreaders that do not block the use of a trocar in an operation or that improve the support surface of the organ to be removed by reducing the tension experienced by the organ as it lies on linear elements and not on a flat surface, which results in a better quality of the operation performed.

DESCRIPTION OF THE INVENTION

The object of the invention is a device for providing the function of a spreader to a surgical instrument of 5 mm in diameter, i.e. it allows a laparoscopic forceps, a holder (which is a suture instrument) or an aspirator, for example, in addition to performing the function for which it is originally intended, to also allow by means of a body associated with a linear body of circular section of the surgical instrument to perform the function of a spreader.

The device for providing the spreading function to a surgical instrument of 5 mm diameter subject of the invention comprises a body which, in turn, comprises a first side and a second side, such that said second side comprises at least two grooves configured to perform a folding of the body; a housing configured to be traversed by the linear body of circular section, and two tabs having a section with a circular sector shape and spaced a distance apart such a distance the linear body of circular section of the surgical instrument can be housed between the tabs, such that the body is configured to adopt two positions: in a U-shaped folded position and in a flat unfolded position.

In the device for providing the spreading function to a surgical instrument of 5 mm diameter object of the invention the tabs are triangular in shape, so that a clamp located at one end of the linear body of circular cross-section can fix the body at the end.

In the device for providing the spreading function to a surgical instrument of 5 mm diameter object of the invention the body has an oval or elliptical shape.

In the device for providing the spreading function to a surgical instrument of 5 mm diameter object of the invention the grooves have two sides forming 90° to each other.

In the device for providing the spreading function to a surgical instrument of 5 mm diameter object of the invention the housing of the second side of the body has a ring shape.

In the device for providing the spreading function to a surgical instrument of 5 mm diameter object of the invention the tabs have rounded edges.

In the device for providing the spreading function to a surgical instrument of 5 mm diameter object of the invention the body is made of a material to be chosen between stainless steel, titanium, polyamides, and combination of the above.

BRIEF DESCRIPTION OF THE DRAWINGS

The following is a brief description of a series of figures showing technical features that help to better understand the device that is the subject of the invention.

The FIG. 1 shows a plan view of the device for providing the spreading function to a surgical instrument of 5 mm diameter object of the invention seen from the second side.

Figure 1:
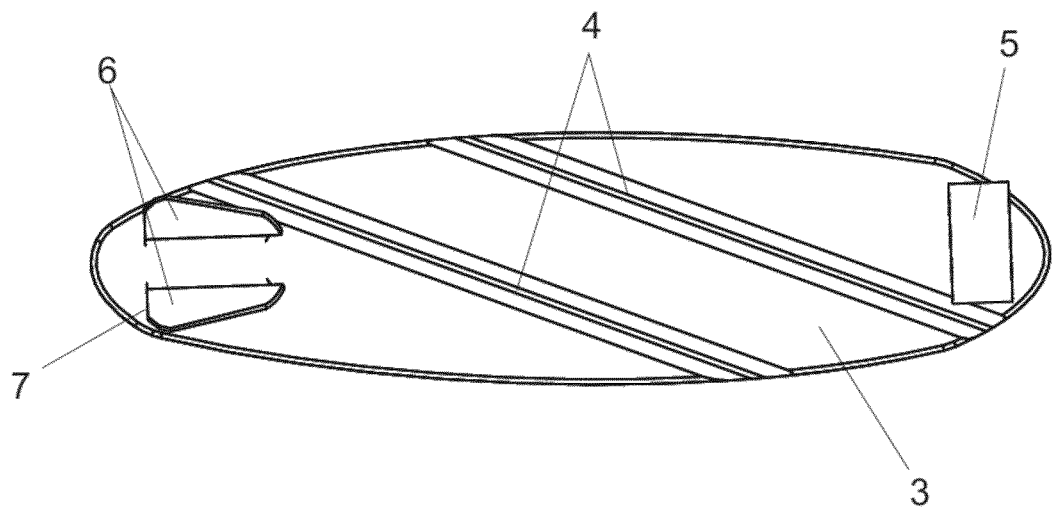
Figure 2:
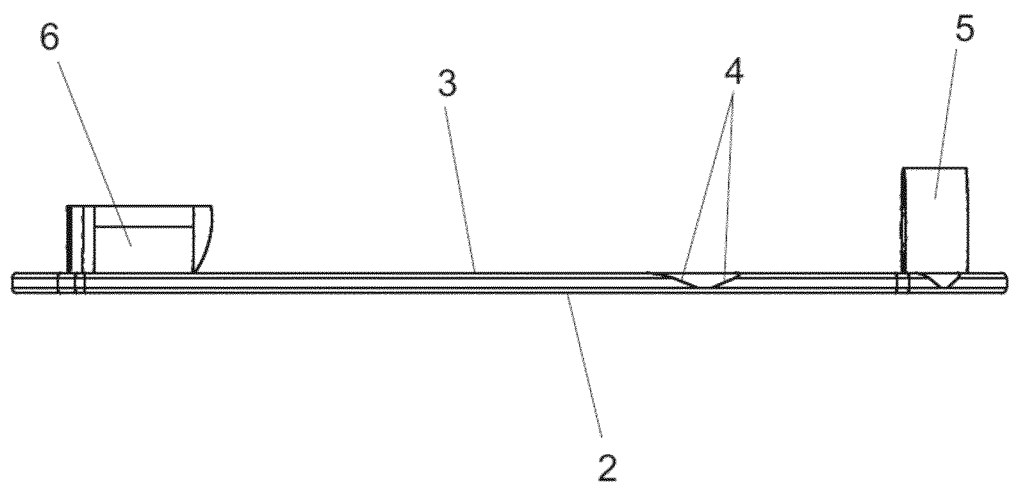

The FIG. 2 shows a side view of the device for providing the spreading function to a surgical instrument of 5 mm diameter object of the invention.

Figure 3:
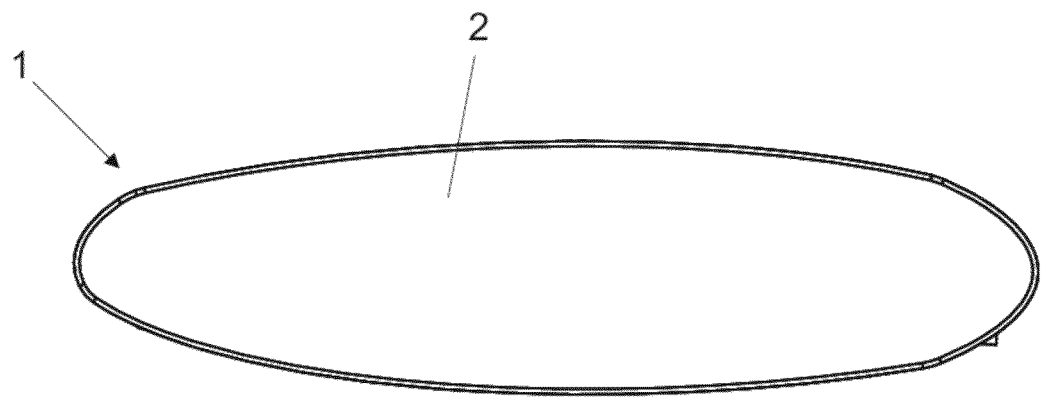

The FIG. 3 shows a plan view of the device for providing the spreading function to a surgical instrument of 5 mm diameter object of the invention seen from the first side.

Figure 4:
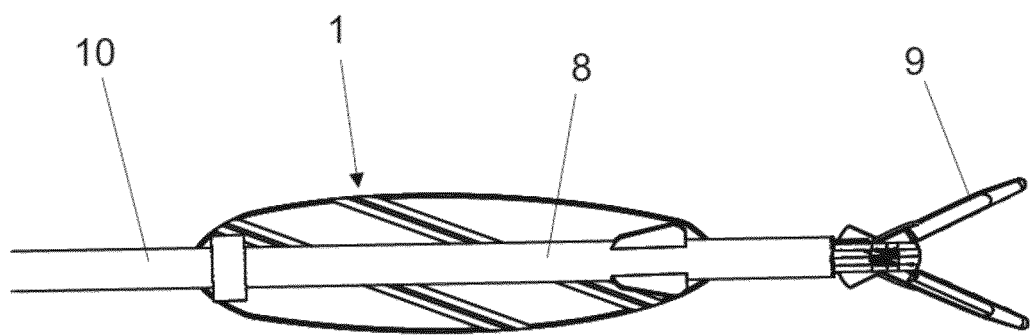

The FIG. 4 shows a view of the device for providing the spreading function to a 5 mm diameter surgical instrument subject of the invention in the laparoscopic clamp.

Figure 5:
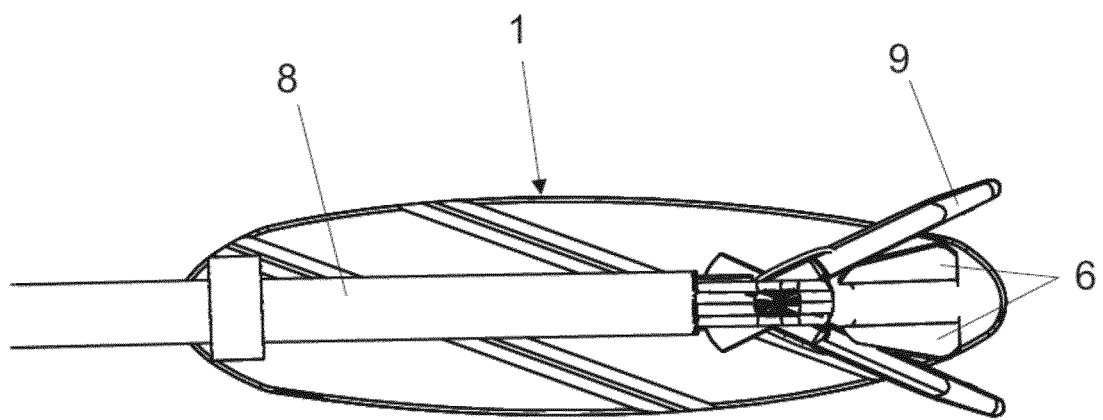

The FIG. 5 shows a view of the device for providing the spreading function to a surgical instrument of 5 mm diameter object of the invention in the laparoscopic clamp in a position different from FIG. 4.

The various numerical references shown in the figures correspond to the following elements:
1. body,
2. first side,
3. second side,
4. groove,
5. housing,
6. tab,
7. rounded edge,
8. laparoscopic forceps,
9. forceps end, and
10. linear body.

DETAILED DESCRIPTION OF THE INVENTION

In view of the foregoing and referring to the numbering adopted in the figures, the object of the invention is a device for providing the spreading function to a surgical instrument of 5 mm diameter, such that the surgical instrument of 5 mm diameter (8) comprises a linear body (10) of circular cross-section.

A preferred embodiment of the invention is developed for use with a laparoscopic forceps, which is a specific instrument among the surgical instruments of 5 mm diameter that exist.

The laparoscopic forceps has the peculiarity that in addition to having the linear body (10) it has an end that houses a clamp (9).

The device for providing the spreading function to a surgical instrument of 5 mm diameter subject of the invention comprises a body (1) which in the preferred embodiment is oval or elliptical in shape, comprising a first side (2) with a flat surface and a second side (3) comprising two grooves (4), such that the grooves (4) make it possible to move the body (1) from an unfolded position to a folded position, so that the body (1) acquires the shape and dimensions to be inserted through the housing provided by a trocar fixed on a patient.

The grooves (4), in the preferred embodiment of the invention have two sides that form 90° between them, so when the device is in folded position, it is formed by three parts that provide the body (1) with a U-shape, such that the linear body (10) of the laparoscopic forceps (8) is placed inside the U.

The second side (3) of the body (1) also comprises:
a housing (5) at one end configured for the linear body (10) of the 5 mm diameter instrument to pass through, and
two tabs (6) having a section with a circular sector shape such that the tabs (6), by means of said circular sector shaped section and the gap between them, enable the linear body (10) of circular section of the laparoscopic forceps (8) to be accommodated between the tabs (6).

In the preferred embodiment of the invention, that developed for a laparoscopic forceps, the tabs (6) are triangular in shape, so that the forceps (9) located at the end of the surgical instrument of 5 mm diameter, being in open position embraces, by means of the jaws of the clamp (9), the tabs (6) fixing the body (1) to the clamp (9), so that by means of the clamp (9) the body (1) can be moved to the desired position, and once in that position, the clamp (9) releases the tabs (6) and the body (1) is fixed to the linear body (10).

Thus, in the preferred embodiment both, by means of the housing (5) and the tabs (6) of the second side (3), the laparoscopic forceps with the forceps end (9) holding the body (1) of the device to provide the spreading function to a surgical instrument of 5 mm diameter object of the invention by means of the triangular-shaped tabs (6) introduces the body (1) through the trocar in the folded position to its position of use inside the body (1), where it passes to the deployed position and is used using the first side (2) of flat surface in contact with the organ to be separated, so that a surface is used for contact with the organ reducing the stress on the organ with respect to the separators known in the state of the art.

In the preferred embodiment of the invention, the housing (5) of the second side (3) of the body (1) is ring-shaped, so that the surgical instrument of 5 mm diameter passes through the ring and moves inside during the performance of a laparoscopy.

The tabs (6) have rounded edges (7) of the triangular shape so that the possibility of damaging any organ of the body during an intervention is reduced because the rounded edges (7) allow sliding the body (1) in contact with an organ without fearing that an edge of an edge will damage the organ.

The body (1) of the device for providing the spreading function to a surgical instrument of 5 mm diameter object of the invention, in the preferred embodiment of the invention is manufactured in a plastic material.

The invention claimed is:

1. A system comprising a surgical instrument and a device configured for providing a spreading function to the surgical instrument 5 mm in diameter, wherein the surgical instrument 5 mm in diameter comprises a linear body of circular cross-section, wherein the device comprises a body comprising:
   a first side, and
   a second side—comprising:
     at least two grooves configured to perform a folding of the body—;
     a housing configured to receive the linear body of circular section of the surgical instrument, and
     two tabs—having a section with a circular sector shape and spaced a distance apart such that the linear body of circular section—can be housed between the tabs—, wherein the body—is configured to adopt two positions:
     a U-shaped folded position formed by at least three different sections of the body with different planes and separated by the at least two grooves—, and
     a flat unfolded position, wherein in the flat unfolded position the housing and the two tabs are configured to simultaneously receive the linear body; and
   wherein the surgical instrument is a laparoscopic instrument.

2. The system according to claim 1, wherein the tabs—are triangular in shape.

3. The system according to claim 1, wherein the body—has an oval or elliptical shape.

4. The system according to claim 1, wherein the grooves—have two sides forming 90° between them.

5. The system according to claim 1, wherein the housing of the second side—of the body—is ring-shaped.

6. The system according to claim 2, wherein the triangular shaped tabs have rounded edges—.

7. The system according to claim 1, wherein the body—is made of a material selected from stainless steel, titanium, polyamides, and a combination thereof.

* * * * *